April 5, 1949.   R. FRIESTEDT ET AL   2,466,407
TOY PLASTIC MOLDING SET

Filed Oct. 11, 1945   2 Sheets-Sheet 1

INVENTORS
RAGNAR FRIESTEDT
RAYMOND C. HALFER
BY Harry H. Hitzeman
ATTORNEY.

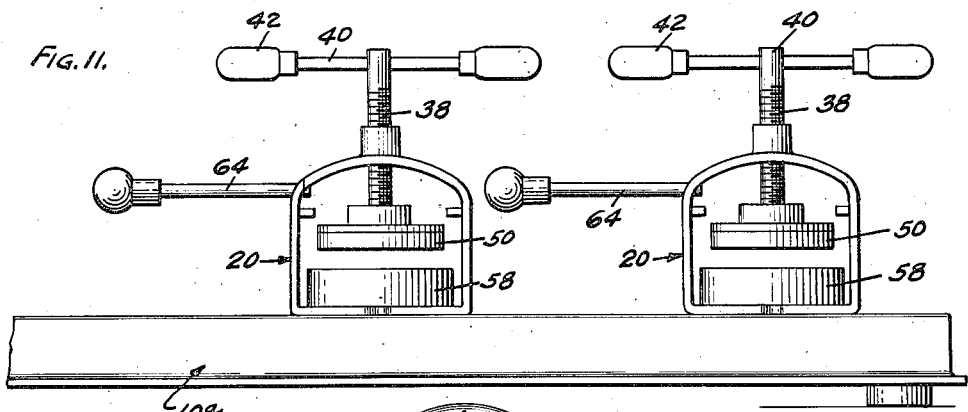

Patented Apr. 5, 1949

2,466,407

UNITED STATES PATENT OFFICE 2,466,407

TOY PLASTIC MOLDING SET

Ragnar Friestedt and Raymond C. Halfer, Chicago, Ill., assignors to Halfer Engineering Company, Chicago, Ill., a firm Application October 11, 1945, Serial No. 621,764

5 Claims. (Cl. 18—17)

Our invention relates to improvements in plastic molding apparatus.

Our invention relates more particularly to a plastic molding set by the use of which an ordinary layman or child will be capable of molding plastic parts by a simple process that is easy to understand and which is easily learned.

The principal object of our invention is to provide an improved construction of plastic molding apparatus constructed of a comparatively few parts which are simple in construction and which apparatus is simple to use and operate so that the apparatus can be adapted as a molding set for children in the nature of a toy or it may also be used by model makers, inventors or others in the production of commercial plastic articles.

A further object of the present invention is to provide an improved plastic molding set or apparatus whereby the platens or dies are removable and interchangeable so that an ordinary layman or a child may remove and replace the dies or platens whenever a different design or shape of molded articles is desired.

A further object of the invention is to provide a construction of plastic molding apparatus so constructed that a new and improved process of molding may be accomplished by the use of the same.

Other objects and advantages will be more apparent from the following description wherein reference is had to the accompanying two sheets of drawings upon which:

Fig. 3 is a plan sectional view through the plastic press taken generally on the lines 3—3 of Fig. 1;

Fig. 4 is a side elevational view of the well ring;

Fig. 5 is a plan view thereof;

Fig. 6 is a cross sectional view of the upper platen or die;

Fig. 7 is a bottom plan view thereof;

Fig. 8 is a cross sectional view of the lower platen or die;

Fig. 9 is a plan view thereof;

Fig. 10 is a plan view of an article of manufacture such as a decorative button, poker chip or similar article which has been made with the dies shown in the drawings.

Fig. 11 is a side elevational view of several of the presses positioned upon a single heating element to illustrate the manner in which a plurality of objects may be molded at the same time.

Figure 1:
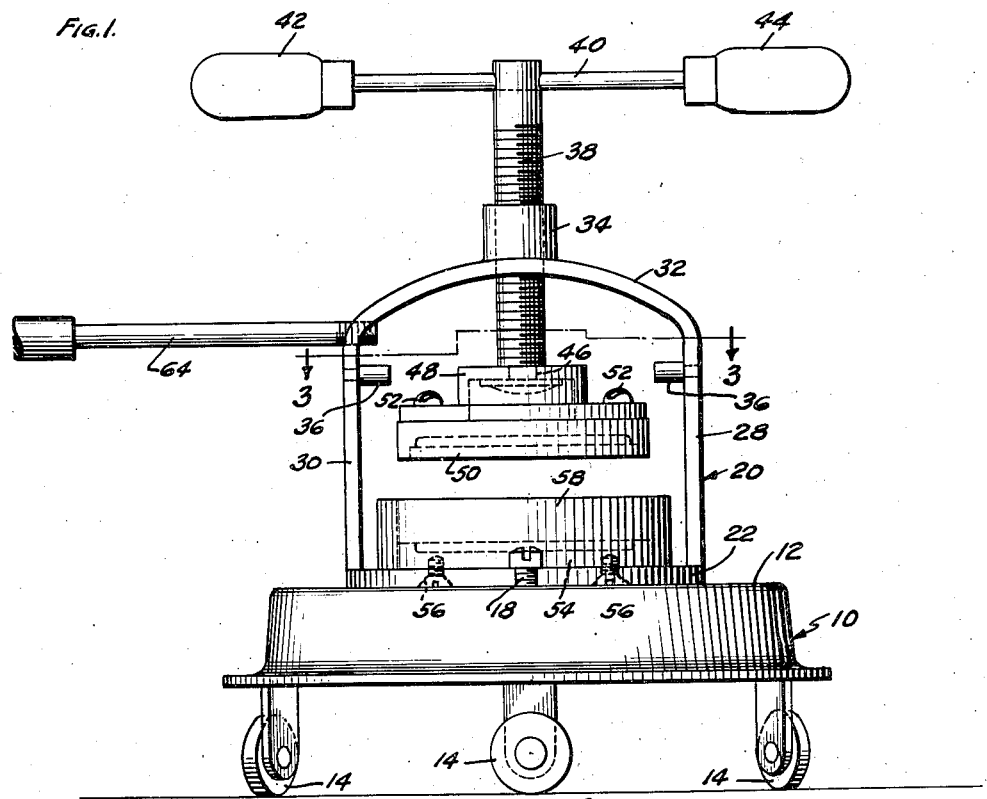
Fig. 1 is a side elevational view of our improved molding set and heater.
Figure 2:
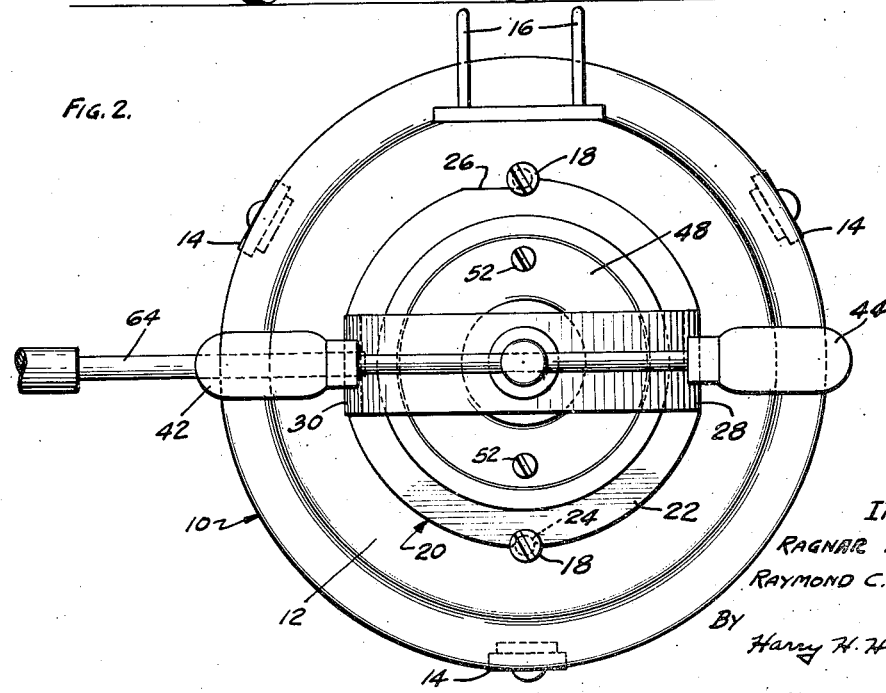
Fig. 2 is a plan view of the same parts.

In the embodiment of the invention which we have chosen to describe, and which is illustrated in the drawings, in Fig. 1 we have shown a heating element 10 which may be of any desired type, having a flat upper platform 12, suitable support members 14 and heating posts 16 which may be connected by an electric conduit to any suitable source of electricity.

We provide a pair of posts 18 in spaced relation positioned on the top 12 of the heating element 10. These posts are provided for the purpose of positioning and locking the press frame 20 upon the heating unit 10, the base 22 of the press frame being formed with the arcuate slot 24 and the cutaway portion 26, so that by positioning the arcuate groove 24 against the shank of one of the posts 18 and the cutaway portion 26 against the other post 18, the press frame is rigidly positioned on the heating element 10.

The plastic press may comprise the frame member 20, as described, provided with the base portion 22 and a pair of side frame members 28 and 30 terminating in an arcuate cross member 32 which is formed with an upwardly extending hub portion 34. A pair of knock-out pins 36 are positioned in the side members 28 and 30 for a purpose which will be presently described. The hub 34 may be suitably tapped to receive a pressure screw member 38 which is provided at its upper end with a cross bar 40 that terminates in a pair of handle portions 42 and 44. A reduced shank 46 of the screw 38 extends through an opening in the top platen holder 48 so that it may be rotatably connected thereto, the head being peaned over to connect the holder and the screw together.

The holder 48 is adapted to carry the upper platen or die 50, the same being connected thereto by a pair of screw members 52. The lower platen 54 is supported from the base 22 of the press and connected thereto by suitable screw members 56. We provide a well ring 58 which is adapted to be loosely positioned about the lower platen or die 54 and resting upon the base 22 of the press member 20.

When it is desired to make an object such as the article 60 shown in Fig. 10, a determined quantity of plastic in granules, is poured into the well ring 58 and the press as a unit is fastened on the heater 10. After the material is in the press the pressure screw is turned down until the top platen touches the material. Then the screw is turned very slowly applying slight pressure to allow for the melting of the material. This ordinarily takes from one to one and one-half minutes after which the upper platen may be screwed down until a positive stop is felt, at which time the plastic material will have completely filled the impression in the platens or dies so that the object to be molded will conform to the configuration of the dies.

The press should be left in this condition on the heater for about three minutes after which the press may be removed from the heating platen and put under a water faucet with a light stream of water to cool off the press. The press may also be dipped into a shallow pan of water or other similar cooling medium which is available. When the platens have been sufficiently cooled the pressure screw may be turned in an upward direction, with the result that the upper platen will be withdrawn and the well ring 58 will follow until it reaches the knock-out pins 36, at which time the ring will be moved away from the upper platen and the plastic article that has been molded can then be removed. The press unit as a whole may be moved around by means of the handle member 64 which is rigidly connected to the press frame 20 and extends to one side thereof.

From the above and foregoing description it can be seen that both the construction provided and the method of operation are comparatively simple, so that model makers or laymen and children are capable of employing our improved press with excellent results. The platens or dies are interchangeable and any desired configuration or shape within limits can be provided in the dies so that articles of any shape can be produced.

In the platens 50 and 54 we have provided a construction wherein a disc or circular article, such as a poker chip or decorative pin, has been produced with a raised star member S shown thereon. It is, of course, obvious that configurations may be provided upon both sides of the molded article and the shape or outline may be varied, as desired, depending upon the die construction entirely.

In Fig. 11, we have illustrated a plurality of press members 20 positioned upon a comparatively long heating element 10—a, it being understood that the heating element may not necessarily be an electric heater. The press may be positioned directly over the gas flame of a gas stove; it may be placed upon a coal stove or any other heating medium that is convenient.

While we have illustrated and described a specific embodiment of the invention, it will be apparent to those skilled in the art that changes and modifications may be made in the exact details shown and we do not wish to be limited in any particular; rather what we desire to secure and protect by Letters Patent of the United States is:

1. Apparatus of the class described including a heating element having a flat upper surface, a pair of posts positioned thereon, a frame member having vertical side walls and a base with notches to engage said posts to position said frame on said heating element, knock-out pins in the side walls of said frame, a vertically disposed pressure screw mounted in said frame, an upper platen carried thereby, a lower platen secured to the base of said frame and a well ring surrounding said lower platen whereby plastic granules may be poured into the same, the platens fastened together and a plastic article molded therein, said knock-out pins adapted when said upper platen is raised to separate the well ring therefrom.

2. Apparatus of the class described including a heating element having a flat upper surface, a pair of posts positioned therein, a U-shaped frame member having a base with notches to engage said posts to position said frame on said heating element, the upper end of said frame member having a tapped boss therein, a vertically disposed pressure screw mounted in said boss, an upper platen carried thereby, a lower platen secured to the base of said frame and a well ring surrounding said lower platen whereby plastic granules may be poured into the same, the platens fastened together and a plastic article molded therein and knock-out pins in the sides of said U-shaped frame member for separating the well ring from the upper platen when the upper platen is raised.

3. Apparatus of the class described including a U-shaped frame member having a circular base portion, a centrally aligned vertical tapped boss therein above said base, a vertically disposed pressure screw mounted in said boss, an upper platen carried thereby, a lower platen secured to the base of said frame member and a well ring surrounding said lower platen whereby plastic granules may be poured into the same, the platens fastened together and a plastic article molded therein and knock-out pins in the sides of said U-shaped frame member for separating the upper platen from the well ring when the upper platen is raised.

4. Molding apparatus comprising a base adapted for placement on a hot plate or the like, a stationary platen, devices for attaching the stationary platen to and in a predetermined position on the upper surface of the base, a stem carrier fixed to and rising from the base to overlie the aforementioned predetermined position on the base, a stem supported and guided by that portion of the carrier which overlies such predetermined position, said stem being longitudinally movable toward and away from such predetermined position, a movable platen carried by the stem in opposition to the stationary platen, a well rim, into which the movable platen may descend, placeable on the upper surface of the base in circumscribing relation to the fixed platen, and knock-out members presented by the stem carrier and lying in the path of the well rim to separate the well rim from the movable platen during travel of the movable platen upwardly away from the stationary platen.

5. Molding apparatus comprising a base adapted for placement on a hot plate or the like, devices for attaching a stationary platen to and in a predetermined position on the upper surface of the base, a stem carrier fixed to and rising from the base to overlie the aforementioned predetermined position on the base, a stem supported and guided by that portion of the carrier which overlies such predetermined position, said stem being longitudinally movable toward and away from said predetermined position, devices for mounting a movable platen on the stem in opposition to a stationary platen attached to the base, a well rim into which may descend a movable platen mounted on the stem, said well rim being arranged and adapted to be carried by the base in circumscribing relation to a fixed platen carried thereby, and abutment means presented by the stem carrier and lying in the path of the well rim to separate the well rim from a movable platen mounted on the stem during travel of such movable platen upwardly away from a stationary platen attached to the upper surface of said base.

RAGNAR FRIESTEDT.
RAYMOND C. HALFER.

REFERENCES CITED

The following references are of record in the file of this patent:

UNITED STATES PATENTS

| Number | Name | Date |
|---|---|---|
| 121,522 | Hyatt, Jr., et al. | Dec. 5, 1871 |
| 138,006 | Cooke | Apr. 22, 1873 |
| 199,340 | Winn and Bliss | Jan. 15, 1878 |
| 233,898 | Villiers | Nov. 2, 1880 |
| 520,294 | Boch | May 22, 1894 |
| 1,502,377 | Davies | July 22, 1924 |
| 1,916,692 | Scribner | July 4, 1933 |
| 1,959,612 | Burke | May 22, 1934 |
| 1,969,323 | Person | Aug. 7, 1834 |
| 1,989,724 | Villanyi | Feb. 5, 1935 |
| 2,102,266 | Handler | Dec. 14, 1937 |